United States Patent [19]

Bucci

[11] Patent Number: 4,934,417
[45] Date of Patent: Jun. 19, 1990

[54] SYSTEM FOR CONTROLLING THE RELEASE OF FUEL VAPORS FROM A VEHICLE FUEL TANK

[75] Inventor: George H. Bucci, Tolland, Conn.

[73] Assignee: Whitehead Engineered Products, Inc., Meriden, Conn.

[21] Appl. No.: 402,943

[22] Filed: Sep. 1, 1989

Related U.S. Application Data

[60] Division of Ser. No. 253,855, Oct. 5, 1988, Pat. No. 4,874,020, which is a continuation-in-part of Ser. No. 31,030, Mar. 26, 1987, Pat. No. 4,887,652.

[51] Int. Cl.$^5$ .............................................. B65B 1/04
[52] U.S. Cl. ........................................... 141/1; 141/5; 141/302; 220/85 VR; 220/86 R
[58] Field of Search ............... 141/1, 4, 5, 46, 302, 141/301, 59; 220/85 VR, 85 VS, 86 R; 137/587, 588, 589; 123/518, 519; 55/387

[56] References Cited

U.S. PATENT DOCUMENTS

| | | | |
|---|---|---|---|
| 3,380,619 | 4/1968 | Boddie | 220/208 |
| 3,394,842 | 7/1968 | Randolph et al. | 220/86 R |
| 4,044,913 | 8/1977 | Brunnert | 220/86 R |
| 4,122,968 | 10/1978 | German | 220/86 R |
| 4,320,853 | 3/1982 | Moore | 220/375 |
| 4,457,325 | 7/1984 | Green | 137/39 |
| 4,572,394 | 2/1986 | Tanahashi et al. | 220/86 R |
| 4,625,777 | 12/1986 | Schmidt | 220/86 R |
| 4,630,740 | 12/1986 | Armstrong et al. | 141/59 |
| 4,659,346 | 4/1987 | Uranishi et al. | 220/86 R |
| 4,676,390 | 6/1987 | Harris | 220/209 |
| 4,699,638 | 10/1987 | Harris | 220/85 VR |
| 4,706,708 | 11/1987 | Fornuto et al. | 220/85 VS |
| 4,714,172 | 12/1987 | Morris | 220/85 VR |
| 4,715,509 | 12/1987 | Ito et al. | 220/85 VS |
| 4,724,861 | 2/1988 | Covert et al. | 141/302 |
| 4,730,652 | 3/1988 | Bartholomew | 141/302 |
| 4,742,809 | 5/1988 | Ito et al. | 220/85 VR |
| 4,747,508 | 5/1988 | Sherwood | 220/85 VS |
| 4,760,858 | 8/1988 | Szlaga | 220/85 VR |
| 4,762,156 | 8/1988 | Rich | 141/46 |
| 4,765,504 | 8/1988 | Sherwood et al. | 220/85 VS |
| 4,770,677 | 9/1988 | Harris | 220/85 VR |
| 4,790,349 | 12/1988 | Harris | 141/46 |
| 4,795,050 | 1/1989 | Smith et al. | 220/85 VR |
| 4,809,863 | 3/1989 | Woodcock et al. | 220/85 VS |
| 4,809,865 | 3/1989 | Mori et al. | 220/85 VS |
| 4,816,045 | 3/1989 | Szlaga et al. | 220/86 R |
| 4,821,908 | 4/1989 | Yost | 220/86 R |
| 4,860,715 | 8/1989 | Hiraku et al. | 123/519 |

Primary Examiner—Henry J. Recla
Assistant Examiner—Glenn T. Barrett
Attorney, Agent, or Firm—Maurice M. Klee

[57] ABSTRACT

A system and method for controlling the release of fuel vapors and liquid fuel from a vehicle fuel tank is provided. The system includes a vent path leading from the dome of the fuel tank to a vapor capture device such that when the fuel tank cap is in place the vent path is opened when the pressure in the dome exceeds a predetermined value, when the cap is removed the vent path is opened irrespective of the pressure in the dome, and upon insertion of the fuel nozzle into the filler pipe the vent path is closed.

1 Claim, 15 Drawing Sheets

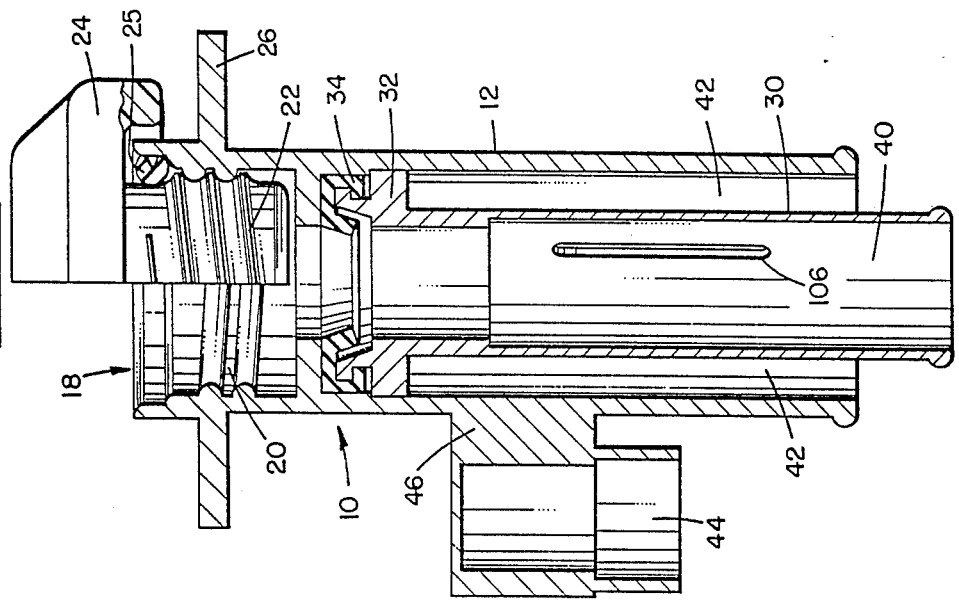
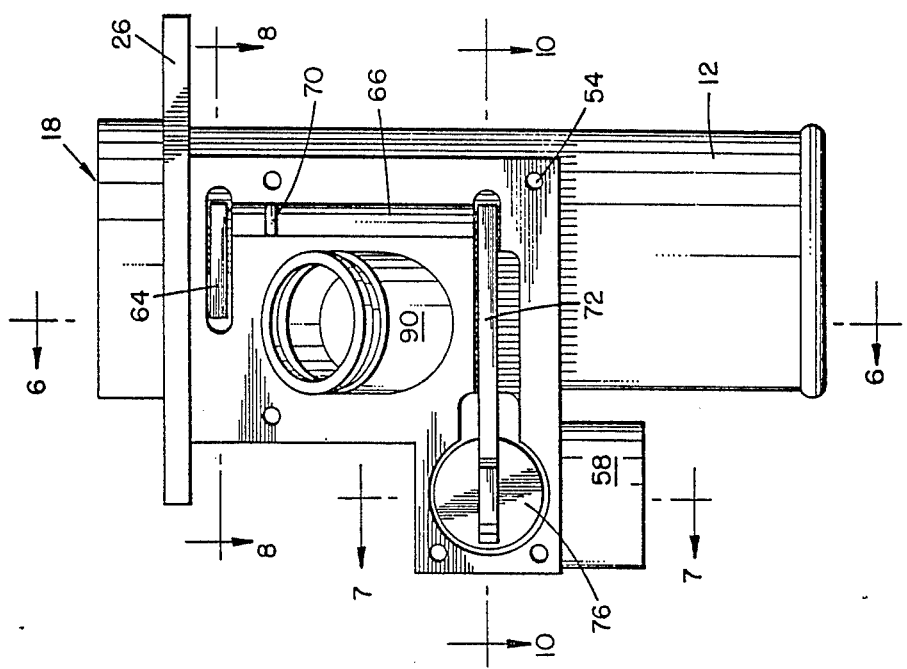

SYSTEM FOR CONTROLLING THE RELEASE OF FUEL VAPORS FROM A VEHICLE FUEL TANK

CROSS REFERENCE TO RELATED APPLICATION

This application is a divisional application of a copending application Ser. No. 253,855, filed Oct. 5, 1988, now U.S. Pat. No. 4,874,020, which is a continuation-in-part application of copending application Ser. No. 031,030 filed Mar. 26, 1987, now U.S. Pat. No. 4,887,652.

BACKGROUND OF THE INVENTION

This invention relates to a system for controlling the release of fuel vapors into the atmosphere from the fuel filler pipe of a vehicle's fuel tank.

As currently designed, vehicle fuel tanks normally operate under a positive pressure. Accordingly, when the filler cap for such a tank is removed, fuel vapors are released into the atmosphere. Similarly, as the tank is filled with fuel, fuel vapors in the tank are forced out of the tank into the atmosphere by the incoming fuel. The release of fuel vapors into the atmosphere under these conditions is undesirable for both environmental and health reasons.

The present invention is directed to controlling the release of fuel vapors into the atmosphere under the foregoing conditions. Specifically, rather than allowing the vapors to escape, the invention routes them to a vehicle-mounted, vapor capture device, such as, a charcoal canister, from which the vapors can be later removed and safely burned in the vehicle's engine.

In addition to controlling vapor escape, the invention also prevents liquid fuel from flowing into the vapor capture device during filling of the fuel tank. Moreover, the invention provides automatic relief for over pressure conditions within the vehicle's fuel tank, is easy to construct, reliable, crash-worthy, and can be readily installed in place of conventional filler pipe assemblies.

In addition to the foregoing, an important application of the invention is to the problem of expulsion of liquid fuel from a vehicle fuel tank after removal of the filler cap. Such expulsion is known to occur for certain vehicles when fuels having an elevated volatility are used or when the vehicle is operated under conditions which result in significant heating of the liquid fuel in the fuel tank. For example, fuel expulsion has been observed for ambulances operated during hot weather and for vehicles in which parts of the exhaust system lie particularly close to the fuel tank.

The expulsion is caused by rapid vaporization of hot fuel in the tank after the pressure in the tank has been released through removal of the filler cap. Depending on the design of the tank and the tank's filler pipe, the amount of fuel left in the tank, and the orientation of the vehicle, such vaporization can eject significant amounts of fuel out of the tank and onto the person who removed the cap. This is obviously a highly dangerous and potentially lethal event and in practice has been found to be an extremely difficult problem to solve for those vehicles which exhibit the problem.

As discussed below, the present invention solves the problem while at the same time providing reliable venting of the fuel tank during normal operation and reliable shut-off of service station fuel pumps during filling of the fuel tank.

SUMMARY OF THE INVENTION

To achieve the foregoing and other goals, the invention provides a fuel filler pipe assembly comprising an outer tube whose lower end is connected to the vehicle's fuel tank and whose upper end is attached, for example, to the sheet metal of the vehicle. The tube has a mouth at its upper end for receiving fuel, to which a cap is attached during use to seal closed the mouth. Preferably, the cap has a male screw thread which mates with a corresponding female screw thread formed in the mouth of tube.

The inside of the outer tube includes a partition which divides the interior of the tube into two conduits—a first conduit for carrying fuel from the mouth to the fuel tank and a second conduit, isolated from the mouth, for carrying fuel vapors out of the fuel tank to the vapor capture device. In certain preferred embodiments of the invention, the partition is in the form of an inner tube disposed within the outer tube. For this configuration, the bore of the inner tube carries fuel from the mouth to the fuel tank, and the space between the inner and outer tubes carries fuel vapors to the vapor capture device.

Attached to the second conduit is a third conduit for connecting the second conduit to the vapor capture device. Passage of fuel vapors through the third conduit is controlled by a valve assembly. The state of this assembly, i.e., whether it is open or closed, is controlled by the attachment and detachment of the filler cap to the outer tube. Specifically, attachment of the cap causes the valve assembly to close so as to seal the fuel tank, while detachment causes the assembly to open so that fuel vapors are routed from the fuel tank to the vapor capture device.

In this way, the fuel tank can be pressurized during normal operation of the vehicle with the cap in place. As the cap is removed, the valve assembly opens thus venting substantially all of the pressurized fuel vapors within the tank to the vapor capture device, rather than allowing these vapors to escape into the atmosphere. Similarly, as fuel is introduced into the tank through the mouth of the tube, substantially all of the fuel vapors which are displaced by the entering fuel leave the tank through the second and third conduits and the open valve assembly, rather than through the mouth of the tube. To further ensure that the displaced fuel vapors leave the tank though the second and third conduits, a seal is preferably formed between the fuel filler nozzle and the first conduit.

In certain preferred embodiments of the invention, wherein a male screw thread is used on the cap and a female screw thread is formed in the mouth of the outer tube, the coordination between the opening and closing of the valve assembly and the detachment and attachment of the cap is achieved by the movement of the male screw thread within the female screw thread. In connection with these embodiments, it is further preferred to use a valve assembly which includes a normally-closed valve connected to a mechanical linkage which is activated by contact with the male screw thread as that thread rotates within the female screw thread.

As discussed in detail below, a preferred form of such a mechanical linkage comprises a pivoted cam arm, a spring which urges the cam arm into contact with the normally-closed valve to open that valve, a second pivoted cam arm which is contacted by the male screw thread, and a rotatable post which connects the two cam arms so that contact of the male screw thread with the second cam arm causes that arm to rotate which, in turn, rotates the first cam arm, moving it away from the valve so that the valve can close. As also discussed below, it is further preferred to place a vapor barrier between the cam arms so as to prevent fuel vapors from reaching the mouth of the outer tube by following the path of the mechanical linkage.

In addition to the foregoing, it is also preferred that the valve assembly include a normally-closed valve which is designed to open when the pressure within the fuel tank exceeds a predetermined value. In this way, excess pressure which may develop within the tank is automatically vented to the vapor capture device.

In connection with other preferred embodiments, a second valve (liquid discrimination valve) is provided which closes the second conduit when liquid fuel reaches a predetermined level within the second conduit. This valve prevents substantial amounts of liquid fuel from being pumped into the vapor capture device during filling of the fuel tank. When such a valve is used and when a seal between the first conduit and the fuel filler nozzle is also used, it is further preferred to provide an overpressure or relief valve between the second conduit and the mouth of the outer tube so as to provide a path for fuel to leave the fuel tank if the automatic shut-off of the fuel filler pump should malfunction and not shut off the pump once the fuel tank has been filled or if the user should continue to pump fuel into the tank after the tank is full.

As discussed below, a preferred form for the second valve comprises a ball and seat valve employing a ball having a lower density than the liquid fuel so that the ball rises into the seat and closes off the second conduit as the level of fuel rises in that conduit. As also discussed below, in connection with this valve configuration, it is also preferred to baffle the second conduit so as to minimize the chance that liquid fuel splashed up during the filling process will reach the ball and close the valve before the fuel tank has been completely filled. In addition, it is preferred to place a ball, e.g., a metal ball, having a higher density than the liquid fuel below the ball with the lower density so that if the vehicle should roll over, the second valve will automatically close by means of the higher density ball forcing the lower density ball into the valve seat.

An important feature of the invention is the fact that in terms of its relationship to the vehicle, the assembly of the invention has basically the same structure as conventional filler pipes. Thus, as with a conventional filler pipe, there is only one connection between the assembly and the vehicle's fuel tank. Similarly, the mouth of the assembly is mounted to the vehicle in the same manner as conventional filler pipes. Accordingly, the assembly of the invention can be used in place of conventional filler pipes with a minimum of changes to the manufacturing process. Also, because of the similar structure and attachment points, crashworthiness of the overall fuel supply system is not compromised by the substitution of the assembly of the invention for a conventional filler pipe.

As discussed above, an important application of the invention is to the problem of fuel expulsion from the filler pipe of a vehicle's fuel tank upon removal of the filler cap. If the temperature and volatility of the fuel in the tank are high enough, the reduction in tank pressure which occurs when the filler cap is removed can result in rapid vaporization ("boiling") of the heated fuel. Depending on a variety of variables, including the amount of fuel left in the tank, the orientation of the vehicle, and the design of the tank and the filler pipe, this rapid vaporization, in turn, can cause fuel to be expelled from the filler pipe.

The filler pipe assembly of the invention, by releasing the pressure in the tank as the filler cap is removed from the filler pipe, significantly reduces the chances of expulsion since it allows time for the fuel to cool through vaporization before the cap is completely separated from the filler pipe. The fuel vapors produced during the cooling process are routed to the vapor capture device by the cap-controlled valve assembly and thus do not escape into the environment.

For some vehicles, however, even this cooling is not sufficient to guarantee no expulsion under all operating conditions. To provide this level of assurance, the filler pipe assembly is combined with the following components which together essentially completely eliminate the problem of expulsion: (1) a first, normally-closed, flapper door and a flapper-door/fuel-nozzle seal, both of which are located in the region of the the mouth of the filler pipe assembly, above the level at which fuel vapors pass into the cap-controlled valve assembly: (2) a second, normally-closed, flapper door and a flapper-door seal, both of which are located below the level at which fuel vapors pass into the cap-controlled valve assembly: and (3) a vent conduit which connects the fuel tank to the filler pipe assembly at a level between the first and second flapper doors.

The first flapper door is spring loaded against the flapper-door/fuel-nozzle seal so as to seal closed the mouth of the filler pipe. This door/seal combination provides the first line of defense against the expulsion of liquid fuel from the mouth. Specifically, the door is closed against the seal as the cap is separated from the filler pipe assembly, and thus even if the fuel in the tank should boil violently, no fuel can escape past the door into the filler pipe's mouth.

The flapper-door/fuel-nozzle seal is located above the first flapper door. As a service station fuel nozzle is inserted into the filler pipe assembly during refueling, this seal engages the outer surface of the nozzle. As the nozzle is inserted further into the assembly, it contacts and opens the first flapper door. Because the nozzle and the seal have already mated at this point, expulsion continues to be prevented even though the flapper door has opened.

The second flapper door is located below the first flapper door and below the cap-controlled valve assembly. This door is spring loaded against the flapper-door seal so as to seal closed the conduit which carries fuel from the mouth of the filler pipe assembly to the fuel tank. The door thereby isolates the cap-controlled valve assembly from the fuel tank. As a result of this isolation, liquid fuel is prevented from reaching the valve assembly (as well as the mouth of the filler pipe assembly) both during normal operation of the vehicle and during times when the filler cap has been removed, but refueling has not yet begun.

It is important to prevent liquid fuel from reaching the valve assembly during these times since, as discussed below, it is during these times that the valve assembly functions as part of the vent path for fuel vapors in the fuel tank. If significant amounts of liquid fuel were to reach the valve assembly and if the assembly included a liquid discrimination valve, as is preferred, the valve assembly would close, thus preventing further venting of the fuel tank.

During refueling, the service station nozzle contacts the second flapper door and pushes it open. In contrast to the flapper-door/fuel-nozzle seal used with first flapper door, the flapper-door seal used with the second flapper door does not form a seal with the fuel nozzle. This seal is not formed so that fuel vapors displaced from the fuel tank by the incoming fuel can pass around the nozzle, through the second flapper door, and through the cap-controlled valve assembly to the vapor capture device.

The vent conduit connects the uppermost portion or portions of the fuel tank to the filler pipe assembly. This conduit carries fuel vapors from the tank to the cap-controlled valve assembly during (1) normal operation of the vehicle when the filler cap is on, and (2) when the filler cap has been removed, but refueling has not yet begun.

As discussed above, the cap-controlled valve assembly preferably includes a normally-closed valve which opens at a predetermined pressure. During normal operation, with the filler cap in place, this valve is closed. The vent conduit connects the main body of the fuel tank to this normally-closed valve. When the pressure in the fuel tank exceeds the predetermined pressure, the valve opens and the fuel vapors in the tank flow through the vent conduit to the vapor capture device until the pressure in the tank is reduced below the predetermined pressure, whereupon the valve closes.

The use of a pressure-controlled valve to vent the fuel tank is an important advantage of the invention since it limits the amount of fuel vapors generated in the tank, that is, since the fuel in the tank is held at a pressure above atmospheric pressure, it vaporizes less. This, in turn, reduces the amount of fuel vapors transferred to the vapor capture device. This reduction, in turn, makes it easier to purge the vapor capture device to the vehicle's engine without degrading engine performance through an overly rich fuel/air mixture. Thus, by limiting the amount of fuel vapors formed in the fuel tank, the invention is able to achieve an overall improvement in the functioning of the vehicle's fuel vapor control system.

In addition to carrying fuel vapors during normal operation, the vent conduit also carries vapors when the filler cap has been removed. Under these conditions, the pressure in the fuel tank is reduced since the cap-controlled valve assembly is open. As discussed above, this reduction in pressure can result in rapid vaporization of liquid fuel in the tank and thus the generation of large amounts of fuel vapor. Accordingly, it is important to size the vent conduit (and the cap-controlled valve assembly) to carry substantial amounts of vapor.

Even when so sized, some back pressure due to resistance to flow in the conduit and the valve assembly can exist in the fuel tank when fuel temperatures and/or fuel volatility are high. Depending on the amount of fuel in the tank, the orientation of the vehicle, and the design of the fuel tank and filler pipe, this back pressure can cause liquid fuel to move into the filler pipe assembly. It is for this reason that the second flapper door and its seal are necessary so as to prevent such liquid fuel from reaching the liquid discrimination valve and shutting off the vent path.

During refueling, the vent conduit needs to be closed so that liquid fuel will be driven onto the fuel filler nozzle's aspirator to shut off the service station fuel pump. Specifically, venting of the upper portion or portions of the fuel tank is stopped during refueling so that liquid fuel will be driven up the fuel carrying conduit and/or a separate shut-off conduit, if used, when those conduits become covered with fuel. In this way, normal fill levels to the tops of the fuel carrying conduit and/or the shut-off conduit are achieved. Such levels preserve a space at the top of the fuel tank for expansion of the fuel.

The desired closing of the vent conduit during refueling can be achieved most conveniently by means of the first flapper door. Specifically, in accordance with this approach, the portion of the vent conduit which engages the filler pipe assembly is equipped with a seal which engages the bottom or back side of the flapper door as that door is pushed open by the fuel nozzle. The vent conduit is thus automatically closed when the fuel nozzle is inserted into the filler pipe assembly at the beginning of refueling. Other approaches, of course, can be used if desired.

The operation of the flapper doors, seals, vent conduit, and cap-operated valve assembly for various tank configurations is described in detail below in connection with the description of the preferred embodiments of the invention.

The accompanying drawings, which are incorporated in and constitute part of the specification, illustrate the preferred embodiments of the invention, and together with the description, serve to further explain the principles of the invention.

BRIEF DESCRIPTION OF THE DRAWINGS

FIG. 4 is a side view of the assembly with the cover plate for the housing portion of the assembly removed.

FIG. 5 is a cross-sectional view along lines 5—5 in FIG. 3. FIG. 5 also illustrates the mating of the fuel tank's filler cap with the fuel filler pipe assembly.

FIGS. 8 and 9 are cross-sectional views along lines 8—8 in FIG. 4. FIGS. 10 and 11 are cross-sectional views along lines 10—10 in FIG. 4.

In FIGS. 16-18, the fuel tank has a single dome and a conduit separate from the main fuel-carrying conduit for establishing the tank's fill line, i.e., for wetting the shut-off aspirator of a service station fuel nozzle. FIG. 16 shows the running (cap-on) condition of the system; FIG. 17 shows the cap-off condition; and FIG. 18 shows the refueling condition. FIGS. 21, 22, and 23 are expanded views of the upper portion of the filler pipe of FIGS. 16, 17, and 18, respectively.

FIG. 19 shows a single dome fuel tank wherein the conduit which establishes the fill line comprises the space between two hoses which connect the filler pipe assembly to the fuel tank.

FIG. 20 shows the cap-on condition of a fuel tank having multiple domes and a separate conduit for establishing the fill line.

DESCRIPTION OF THE PREFERRED EMBODIMENTS

Figure 1:
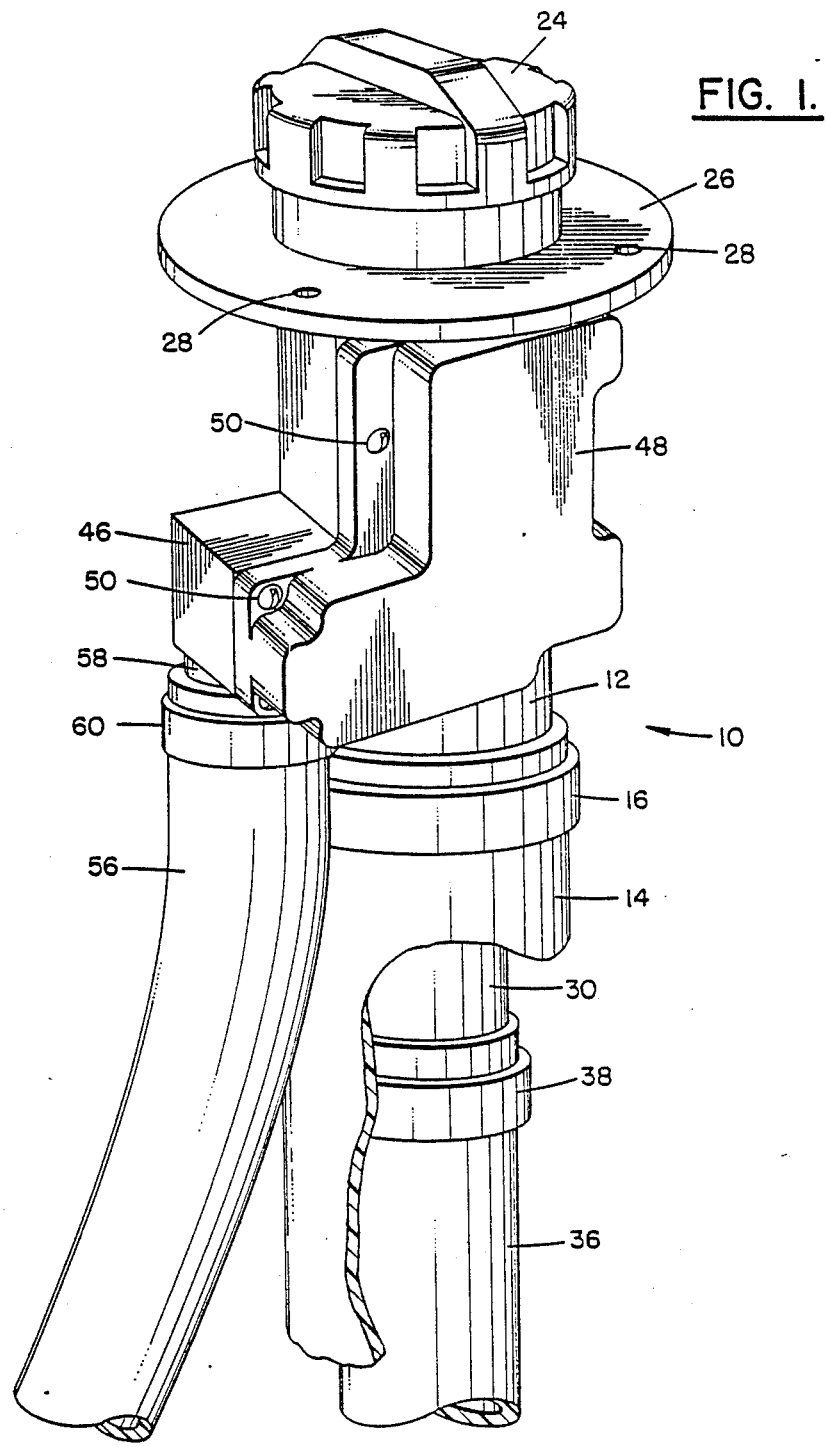
FIG. 1 is a perspective view of a fuel filler pipe assembly constructed in accordance with the present invention.
Figure 2:
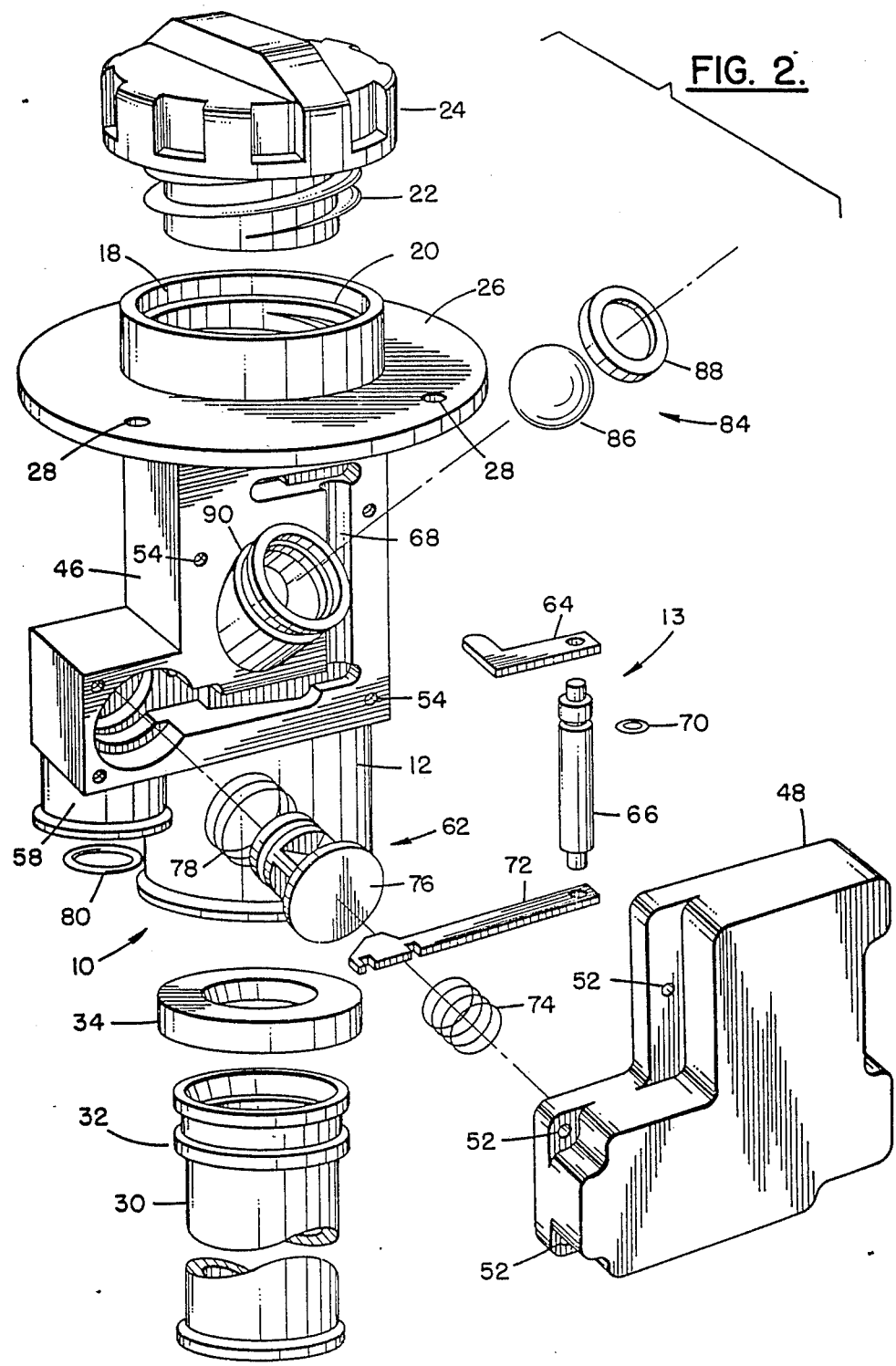
FIG. 2 is an exploded view of the assembly of FIG. 1.
Figure 3:
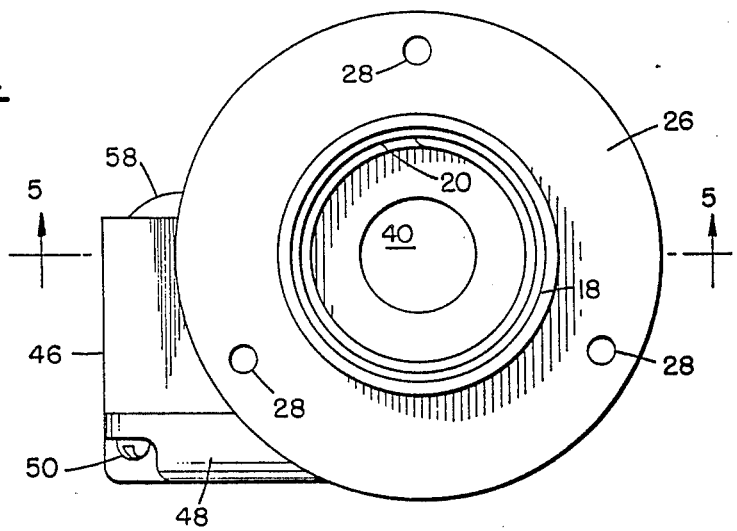
FIG. 3 is a top view of the assembly of FIG. 1 with the fuel filler cap removed.

With reference now to the drawings, wherein like reference characters designate like or corresponding parts throughout the several views, there is shown in FIGS. 1 and 2 a perspective and an exploded view, respectively, of fuel filler pipe assembly 10 constructed in accordance with the present invention.

Assembly 10 includes outer tube 12 which is attached to outer hose 14 by hose clamp 16. Outer hose 14, in turn, is attached to the vehicle's fuel tank (not shown) by, for example, a further hose clamp (not shown). At its upper end, outer tube 12 forms mouth 18 for receiving fuel. The inside surface of mouth 18 includes female screw thread 20 which mates with male screw thread 22 carried by cap 24. Flange 26 is attached to outer tube 12 in the region of mouth 18 and is used to mount assembly 10 to the vehicle by means of, for example, sheet metal screws which pass through screw holes 28.

Within outer tube 12 is located inner tube 30 which is attached to inner hose 36 by hose clamp 38. Inner hose 36 lies within outer hose 14. Depending on the desired level to which the vehicle's fuel tank is to be filled, inner hose 36 will either extend beyond outer outer hose 14 into the vehicle's fuel tank or will end within the outer hose. In either case, inner hose 36 is not clamped to the fuel tank, but simply rides within the outer hose. For some tank configurations, inner hose 36 can be eliminated.

The upper end of inner tube 30 is sealed to the inner surface of outer tube 12 by means of flange 32 and grommet 34. During filling of the vehicle's fuel tank, grommet 34 forms a seal around the fuel filler nozzle so as to prevent substantial amounts of fuel vapors form passing out of the fuel tank by means of inner tube 30. Inner tube 30 includes slit 106 which provides a passageway for fuel to move from conduit 42 to conduit 40 as the fuel tank becomes full (see FIG. 12.) The presence of fuel in conduit 40 serves to trigger the automatic shut off sensor (aspirator) used on conventional fuel pump nozzles to shut off the fuel pump when the fuel tank is full. Inner tube 30 also includes aperture 100 which provides a vent path for fuel vapors within conduit 40 which are displaced by the incoming fuel, that is, aperture 100 vents conduit 40 so that slit 106 does not become vapor locked.

Outer tube 12 and inner tube 30 are preferably made of a plastic material, such as, for example, nylon, acetal or polyester, and can be fastened to each other by, for example, ultrasonic welding. Grommet 34 is preferably made of a fluoroelastomer.

Inner tube 30 functions as a partition and divides the interior of outer tube 12 into conduits 40 and 42. Conduit 40 extends from mouth 18 towards the fuel tank and serves to carry fuel from the mouth into the tank. Conduit 42 extends away from the fuel tank, is isolated from mouth 18, and serves to carry fuel vapors out of the fuel tank.

As can be seen most clearly in FIGS. 1-2, the upper portion of assembly 10 includes housing 46 and cover plate 48 which are attached together by screws 50 which pass through screw holes 52 in the cover plate and are received in screw holes 54 in the housing. Alternatively and preferably, the housing and outer tube 12 are molded as a single unit out of a plastic material, such as those discussed above, the cover plate is also made of plastic, and the housing and the cover plate are attached together by ultrasonic welding.

As shown in FIG. 1, hose 56 is attached to housing 46 at port 58 by means of hose clamp 60. Hose 56 leads to a vapor capture device (not shown), such as, a charcoal canister, which is mounted on the vehicle at a suitable location.

Housing 46 and cover plate 48 together form conduit 44 (see FIGS. 5-7) for connecting conduit 42 to the vapor capture device. Housing 46 and cover plate 48 also contain and form part of valve assembly 13 whereby conduit 44 is opened and closed in coordination with the detachment and attachment of cap 24 to mouth 18.

Valve assembly 13 includes: normally-closed valve 62; upper cam arm 64; lower cam arm 72; cylindrical post 66, which is journaled in cylindrical housing 68 formed in housing 46 and a corresponding cylindrical housing formed in cover 48 (not shown); 0-ring 70, which is received on post 66 and forms a seal between the post and the wall of the cylindrical housing so as to create a vapor barrier between the upper and lower cam arms; and spring 74, which urges lower cam arm 72 into contact with valve 62 so as to move the valve into its open position. Cylindrical post 66 connects lower cam arm 72 to upper cam arm 64 so that rotation of the upper cam arm results in corresponding rotation of the lower cam arm.

Figure 7:
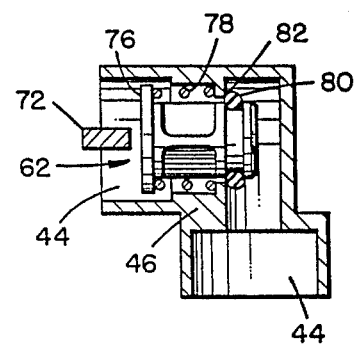
FIG. 7 is a cross-sectional view along lines 7—7 in FIG. 4.

As can be seen most clearly in FIG. 7, valve 62 includes piston 76, spring 78, and 0-ring 80 which mates with surface 82 of housing 46 to close the valve. Spring 78 is preferably chosen so that valve 62 will automatically open at a predetermined pressure, e.g., a pressure on the order of 1-2 psi, so as to relieve excess pressure within the fuel tank such as can occur under hot environmental conditions.

Figure 8:
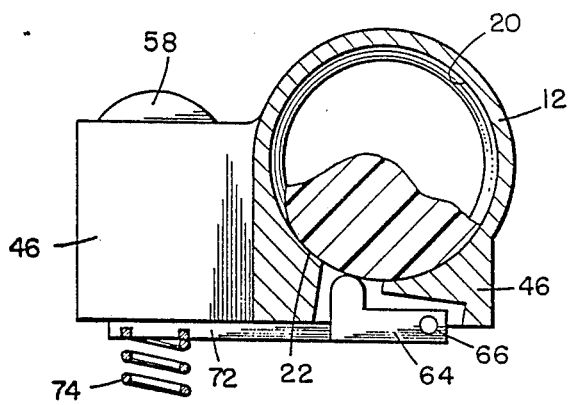
FIGS. 8-11 illustrate the coordination between the opening and closing of the assembly's vapor control valve and the detachment and attachment of the fuel filler cap to the assembly.
Figure 9:
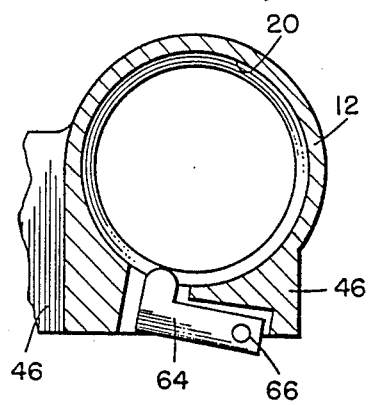
Figure 10:
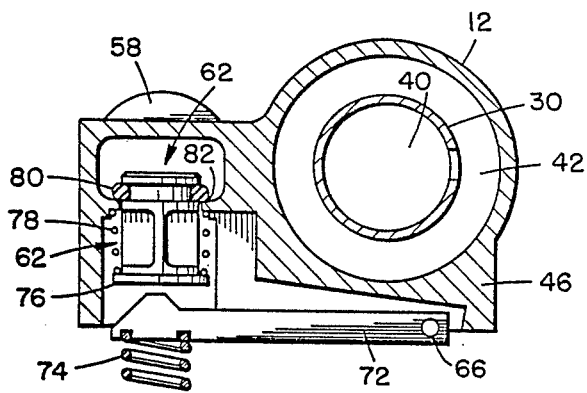
Figure 11:
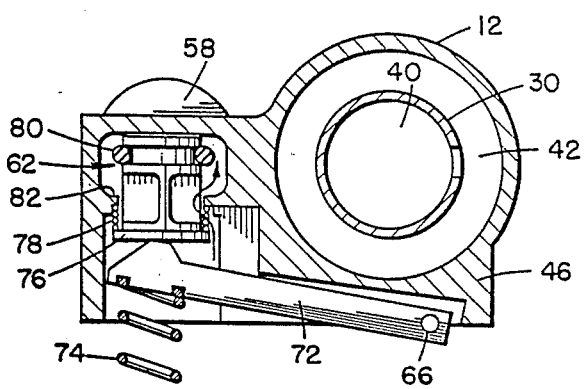

The coordination between the opening and closing of valve 62 and the rotation of male thread 22 in female thread 20 is illustrated in FIGS. 8-11, where FIGS. 8 and 10 show the positions of upper cam arm 64, lower cam arm 72, spring 74, and valve 62 when the male thread is in engagement with upper cam arm 64, and FIGS. 9 and 11 show the positions of the same components when the male thread is out of engagement with the upper cam arm.

Figure 6:
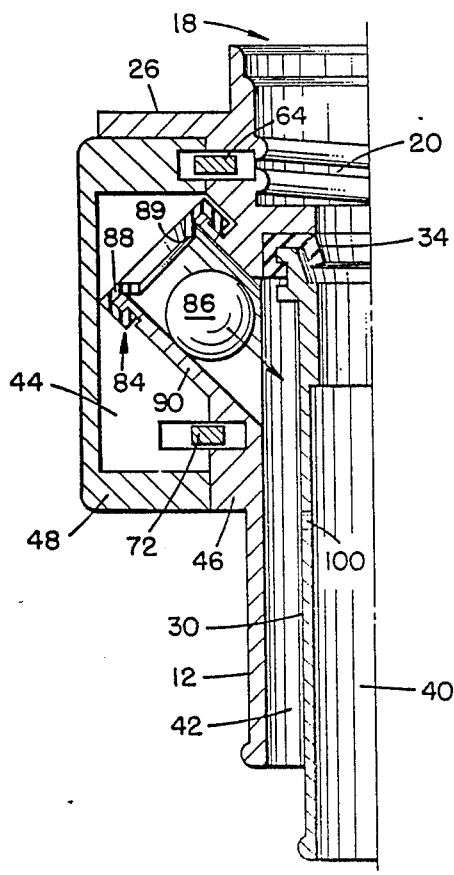
FIG. 6 is a cross-sectional view along lines 6—6 in FIG. 4.

As shown in these figures, engagement causes lower arm 72 to rotate counterclockwise against the force of spring 74 thus allowing valve 62 to move into its normally closed position, while disengagement allows spring 74 to move lower arm 72 into contact with valve piston 76 so as to open the valve by disengaging 0-ring 80 from surface 82. As shown in FIG. 6, upper arm 64 is preferably located towards the bottom of female screw thread 20 so that valve 62 opens at the beginning of the process of removing cap 24 from mouth 18. In particular, valve 62 opens before seal 25 carried by cap 24 disengages from mouth 18 of the assembly (see FIG. 5). In this way, any residual pressure which may be in the fuel tank is vented into the vapor capture device prior to removal of the cap, thus preventing the escape of fuel vapors into the atmosphere.

Figure 12:
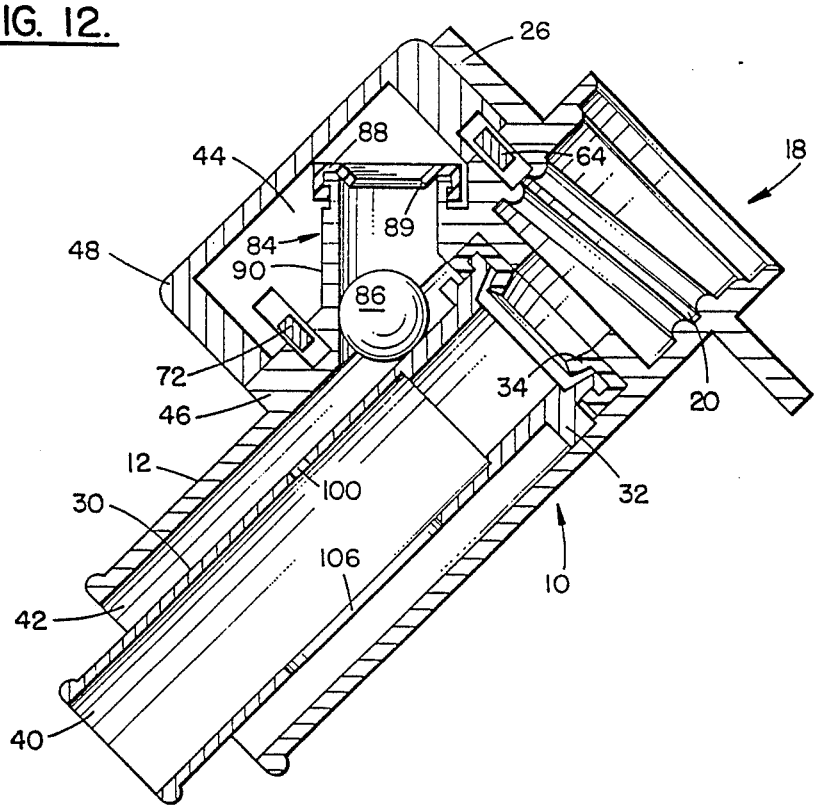
FIG. 12 is a cross-sectional view along lines 6—6 in FIG. 4 illustrating the orientation of the filler pipe assembly when mounted to a vehicle.

In addition to valve 62, assembly 10 also includes valve 84 which closes conduit 42 as liquid fuel reaches a predetermined height in that conduit. As shown in FIG. 6, ball 86 which seats in seal 88 can be used for this purpose. As shown in FIG. 12, assembly 10 is mounted on the vehicle so that ball 86 moves essentially vertically, i.e., the assembly is mounted so that housing 90 for ball 86 is oriented vertically. Ball 86, which must have a lower density than the fuel used in the vehicle, can be a hollow ball made out of polypropylene. Seal 88 includes flexible lip 89 which, along with the vertical movement of the ball, helps prevent the ball from hanging up on the seal.

Figure 13:
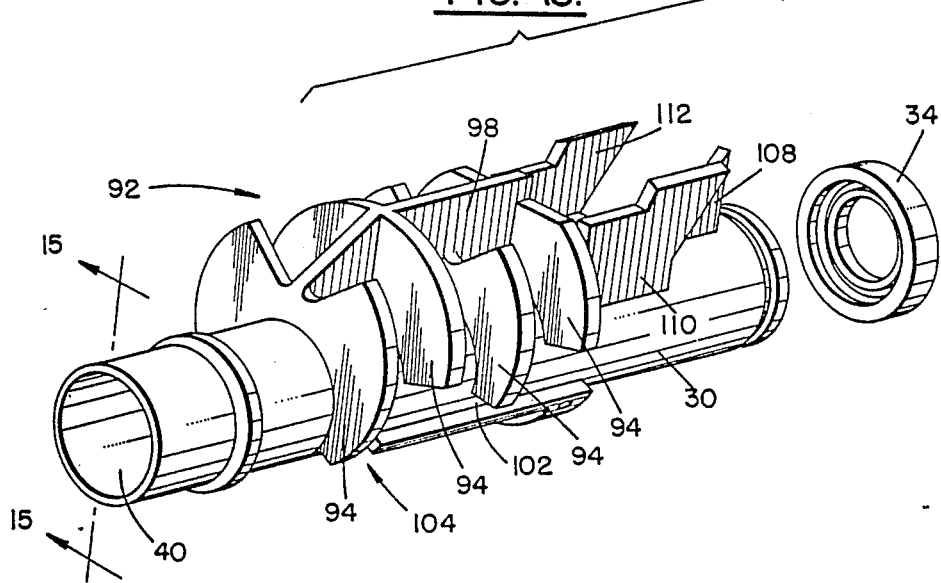
FIG. 13 is a perspective view of a baffle assembly for use with the present invention.
Figure 14:
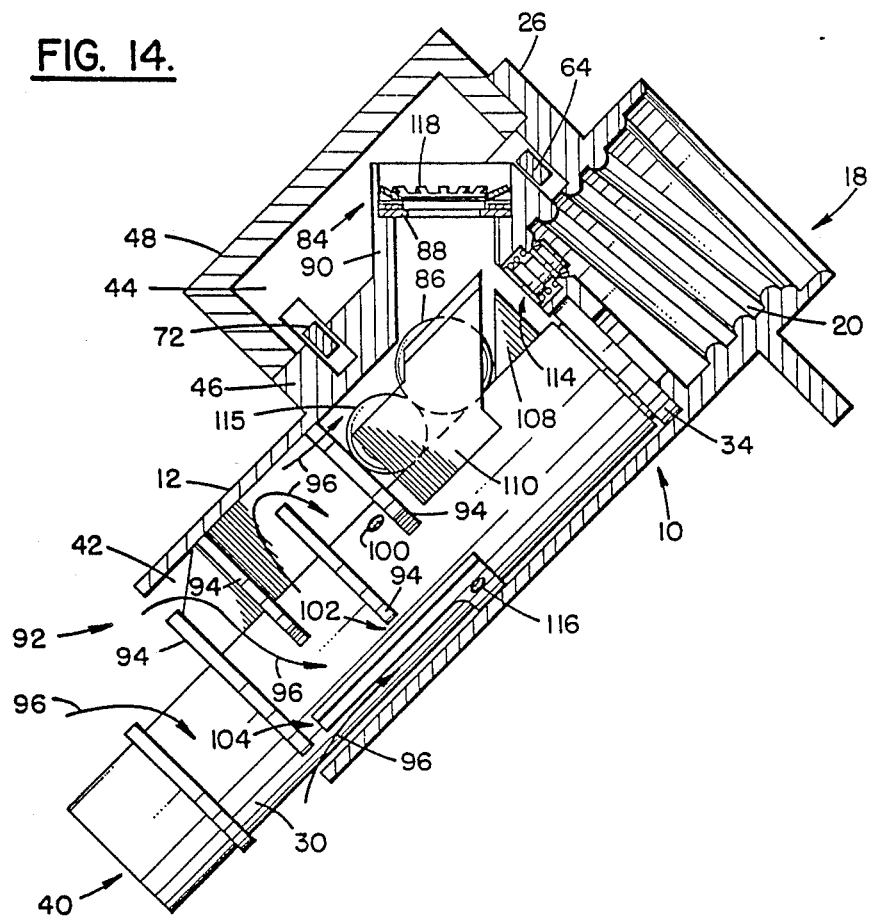
FIG. 14 is a perspective view, partially in section, illustrating the fuel filler pipe assembly with the baffle assembly of FIG. 13 in place.
Figure 15:
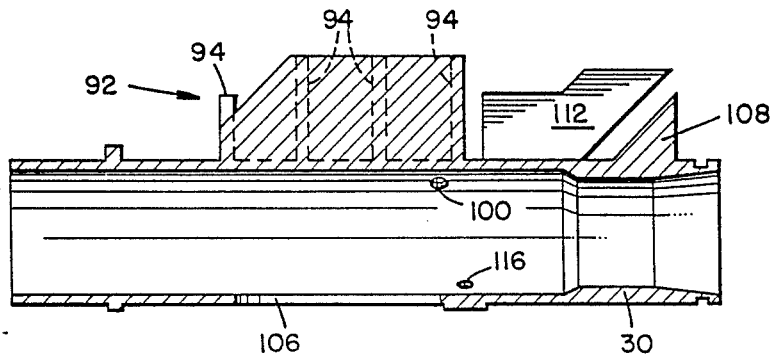
FIG. 15 is a cross-sectional view along lines 15—15 in FIG. 13.

FIGS. 13–15 illustrate the use of baffle assembly 92 for controlling splashing of liquid fuel onto ball 86. Because of the pumping rates used, the filling of a vehicle fuel tank by means of a conventional service station fuel pump results in substantial splashing of the liquid fuel within the fuel tank. This splashing can cause ball 86 to move upward in housing 90 and seat in seal 88 before the fuel tank has been completely filled. This seating, in turn, causes back pressure in conduits 40 and 42 which shuts off the service station fuel pump.

Moreover, if a grommet 34 has been used which forms a seal with the fuel pump's nozzle, as is preferred, ball 86 will remain seated in seal 88 even after the fuel pump has shut itself off, due to the internal pressure within the fuel tank produced by 1) the action of the fuel pump prior to shut off, and 2) the vapor pressure of the fuel in the fuel tank. Although this internal pressure will eventually bleed off through leakage around grommet 34, as a practical matter, to resume pumping in a reasonable amount of time, the user will need to remove the fuel pump nozzle from the filler pipe assembly in order to vent the internal pressure. Baffle assembly 92, by blocking the passage of splashed fuel to ball 86, minimizes the chances that such premature seating of ball 86 in seal 88 will occur before the fuel tank has been fully filled.

As shown in FIGS. 13–15, baffle assembly 92 can consist of a series of four transverse baffles 94 and a midline baffle 98. These baffles create the circuitous route illustrated by arrows 96 in FIG. 14 which fuel must follow to reach ball 86. In practice, it has been found that substantially no fuel splashes are large enough or have sufficient energy to traverse the full circuit and then move ball 86 up into seal 88 without first having entered slot 106 and contacted the aspirator on the nozzle of the service station fuel pump, thus shutting off that pump. Baffle assembly 92 also includes drain passages 102 and 104 which rapidly drain splashed fuel back into the tank so as to minimize the chance that multiple splashes will combine with one another to move the ball. Other baffle constructions besides the one illustrated in the figures can be used in the practice of the invention. For example, six baffles, rather than four baffles, can be used to provide even greater splash protection for ball 86.

As shown in the figures, baffle assembly 92 is conveniently formed on the outside surface of inner tube 30. In addition to the baffle assembly, guide members 108, 110 and 112, which control the movement of ball 86, are also formed on this surface. As shown in FIG. 14, valve 84 preferably includes a second ball 115. This ball is denser than the liquid fuel and thus remains in contact with top baffle 94 during normal operation of the vehicle. As such, it serves as an additional obstacle for splashed fuel. If a vehicle should roll over during accident, ball 115 serves the important function of forcing ball 86 into seal 88 thus preventing fuel from draining out of the fuel tank through conduits 42 and 44. Ball 115 can be made of, for example, stainless steel.

As also shown in FIG. 14, filler pipe assembly 10 preferably includes relief valve 114. This normally-closed valve is designed to open when the pressure in conduit 42 exceeds a predetermined value, such as 1–2 psi. Under normal conditions, this valve remains shut during filling of the fuel tank. However, if valve 84 should close during filling and if fuel should continue to be pumped into the tank, valve 114 will open allowing the excess fuel to pass out of conduit 42 and into mouth 18, thus relieving excess tank pressure and alerting the operator that the service station fuel pump has malfunctioned.

Inner tube 30 and its associated baffle assembly 92 can be attached to outer tube 12 by means of screws (not shown) and screw holes 116. Alternatively, the two tubes can be bonded together by, for example, ultrasonic welding. Grommet 34 forms a seal between the upper end of inner tube 30 and the body of outer tube 12. Grommet 34 also forms a seal about the fuel pump nozzle when the nozzle is inserted into conduit 40. As shown in FIG. 14, inner tube 30 is offset from the center line of outer tube 12. This permits the spring used on some fuel pump nozzles to engage threads 20 in mouth 18 of the filler pipe assembly. As further shown in FIG. 14, sea 88 can be held in place by retaining ring 118.

Based on the foregoing, the operation of the fuel filler pipe assembly of the present invention is as follows. When cap 24 is in place on outer tube 12, the assembly seals the vehicle's fuel tank by means of normally-closed valve 62 and seal 25 carried by the cap. Should excess pressure develop in the tank, valve 62 opens to vent the excess pressure into the vapor capture device through conduits 42 and 44 and hose 56.

When cap 24 is removed from outer tube 12, valve 62 automatically opens so that the fuel vapors within the tank are vented to the vapor capture device. During filling of the tank with fuel, valve 62 remains open so that the vapors displaced by the incoming fuel pass through the valve into the vapor capture device. As the tank becomes full, liquid fuel rises in conduit 42 causing ball 86 to seat in seal 88. This prevents substantial quantities of liquid fuel from flowing through conduits 42 and 44 into the vapor capture device. When cap 24 is replaced on outer tube 12, valve 62 closes and the fuel tank is once again sealed.

Figure 16:
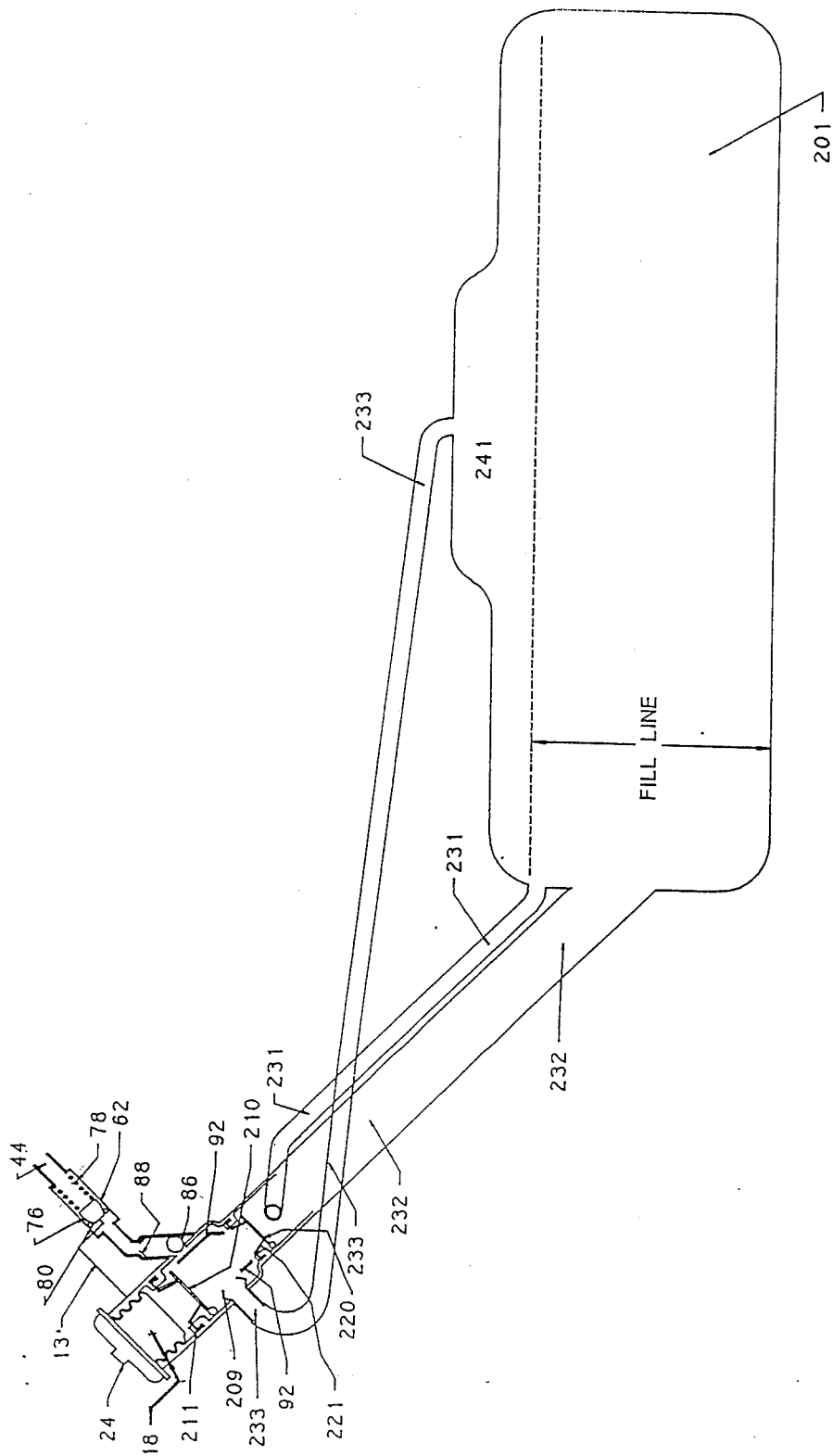
FIGS. 16-23 illustrate the application of the present invention to the problem of expulsion of fuel from a vehicle fuel tank for three types of fuel tanks.

With reference now to FIGS. 16–23, these figures illustrate the application of the present invention to the problem of expulsion of fuel from a vehicle fuel tank. As shown in FIG. 16, the expulsion control system includes valve assembly 13 whose operation is controlled by the attachment and detachment of cap 24 to mouth 18. Valve assembly 13, cap 24 and mouth 18 are constructed and operate in the manner described above. For purposes of clarity in describing the vapor flow paths through the system, the details of construction of assembly 13, as well as the details of construction of baffle assembly 92, are not shown in FIGS. 16–23.

As shown in FIG. 16, fuel tank 201 has a single dome 241 which forms the uppermost portion of the fuel tank. Conduits 231 and 233 connect the fuel tank to main fuel-carrying conduit 232. Conduit 231 defines the fill line for the tank. This conduit is attached to conduit 232 below the level of flapper door 220. During fill-up, this conduit carries liquid fuel to the fuel pump nozzle's aspirator when the level of fuel in the tank rises above the top of the conduit. Conduit 233 carries fuel vapors from tank 201 to valve assembly 13. This conduit joins with conduit 232 between flapper door 210 and flapper door 220, i.e., at the level of cap-controlled valve assembly 13.

Figure 18:
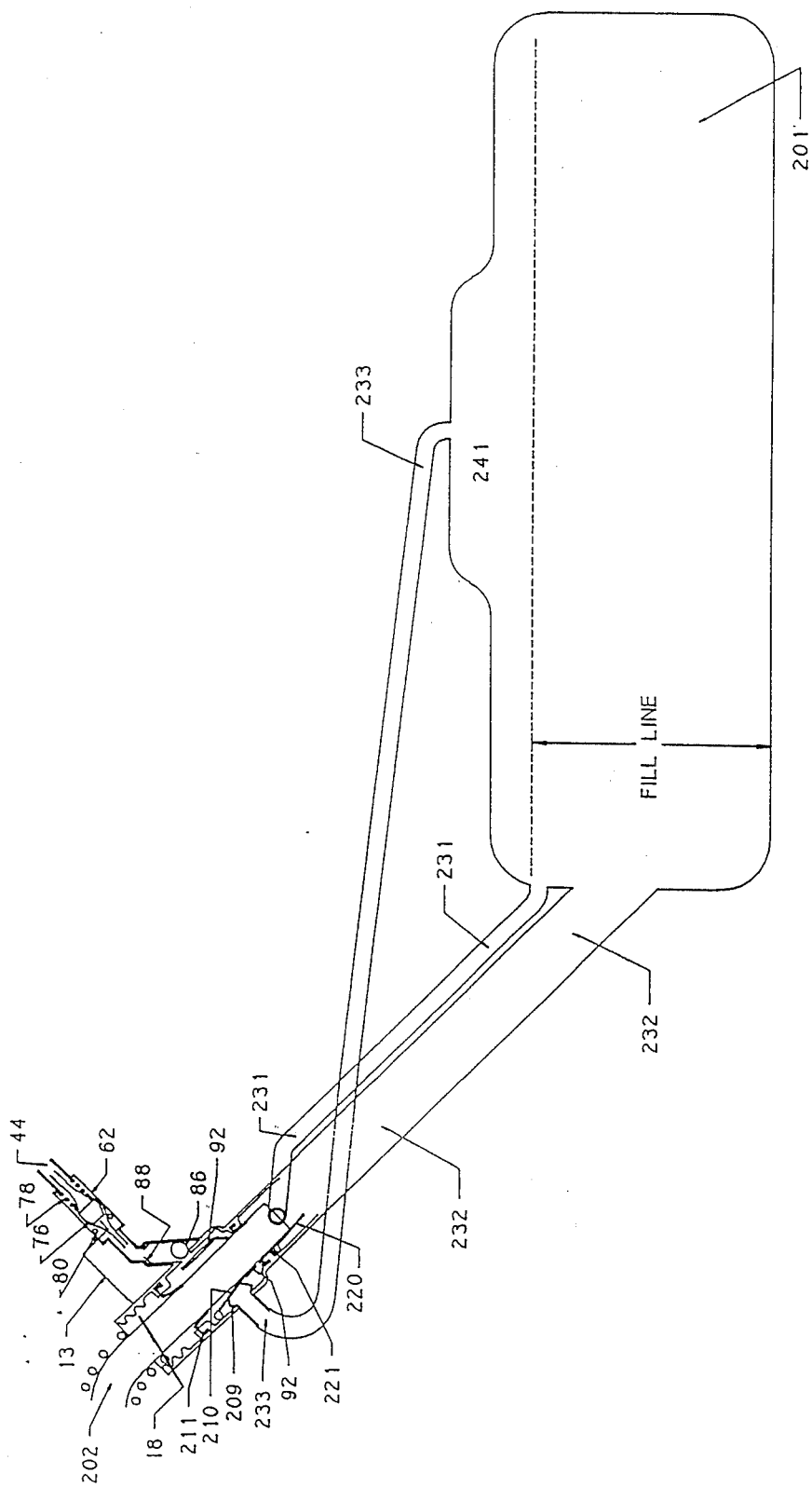
Figure 23:
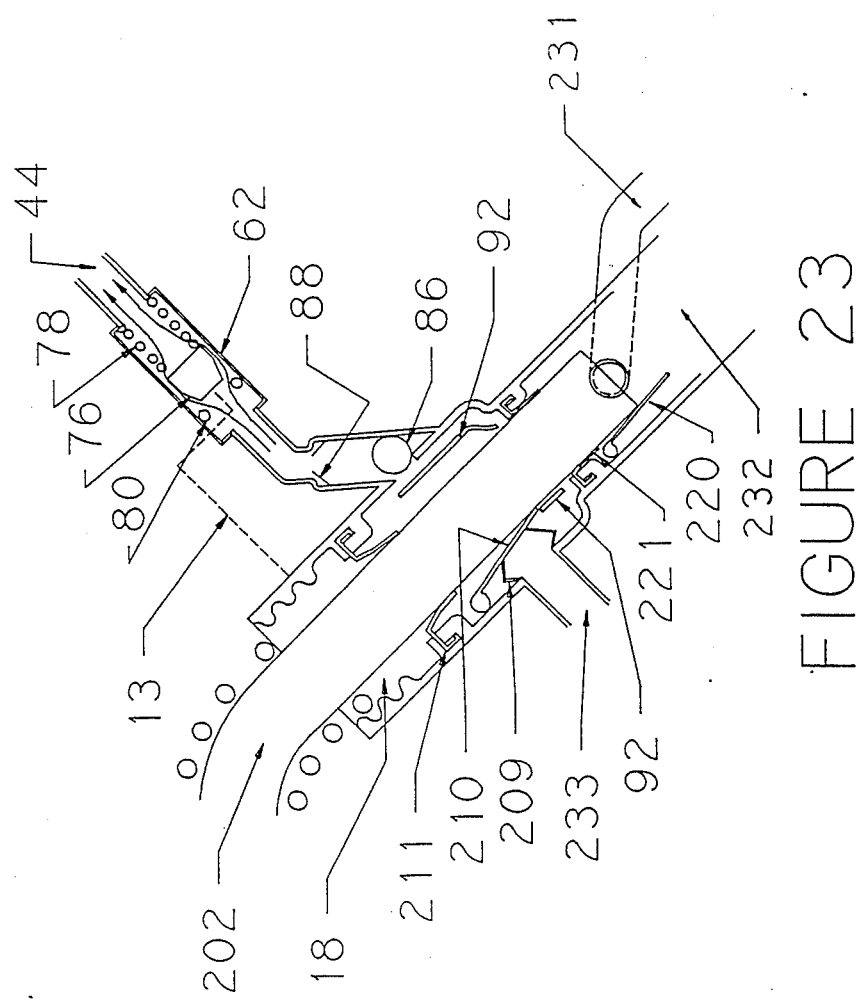

Flapper door 210 is spring loaded against seal 211. As shown in FIGS. 18 and 23, this seal also engages and forms a seal with fuel pump nozzle 202 when the nozzle is inserted in conduit 232 during tank fill-up. The end of conduit 233 carries seal 209. When flapper door 210 is pushed open by fuel nozzle 202, the door's back or lower side engages seal 209 and thus closes conduit 233. Flapper door 210 thus performs two sealing operations: one with seal 211 when the door is in its normally-closed position and one with seal 209 when the door is in its open position.

Flapper door 220 is spring loaded against seal 221. Unlike seal 211, seal 221 does not form a seal with fuel nozzle 202 when the nozzle is inserted in conduit 232. In this way, as the tank is filled, fuel vapors can pass around the nozzle, through flapper door 220, through valve assembly 13, and out conduit 44 to a vapor capture device (not shown).

Figure 21:
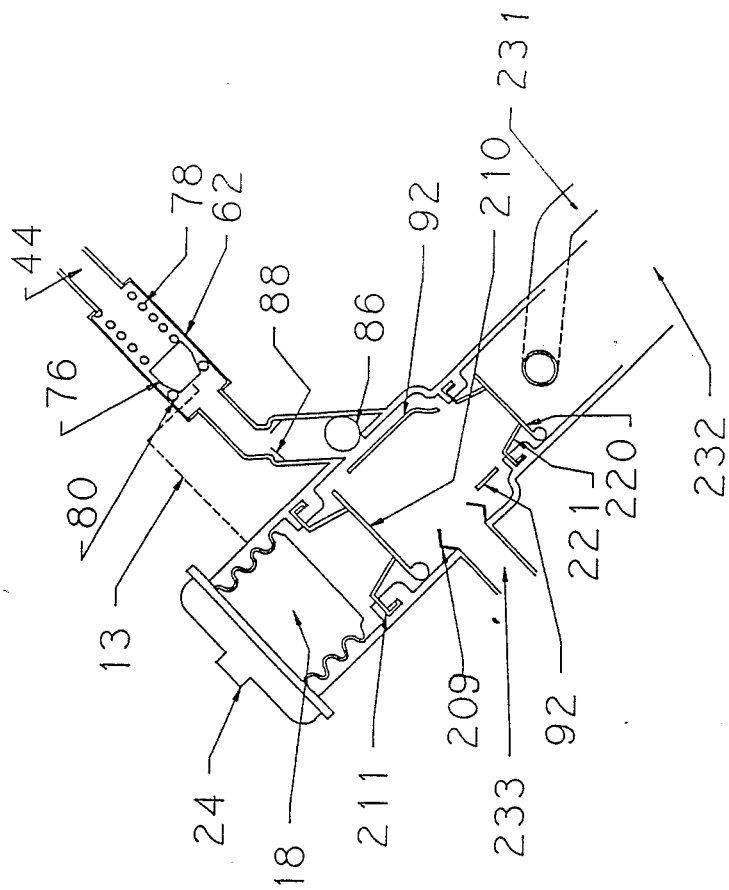

FIGS. 16 and 21 show the configuration of the expulsion control system during normal operation of the vehicle, e.g., when the vehicle is running. Vapors evaporating from the fuel in the tank exit from dome 241 through conduit 233, past baffle assembly 92, past ball 86, until they reach normally-closed, spring-operated valve 62. This valve is designed to open at a predetermined pressure, e.g., 1-2 psi. Accordingly, the valve stays closed until the pressure in dome 241 exceeds the predetermined pressure. The valve then opens allowing fuel vapors to pass into conduit 44 and thence to the vapor capture device. Liquid fuel does not contact ball 86 in this configuration because flapper door 220 is sealed against seal 221 and because conduit 233, which is never submerged during normal operation, vents the pressure in the tank to a low value, e.g., on the order of 1-2 psi, through valve 62.

Figure 17:
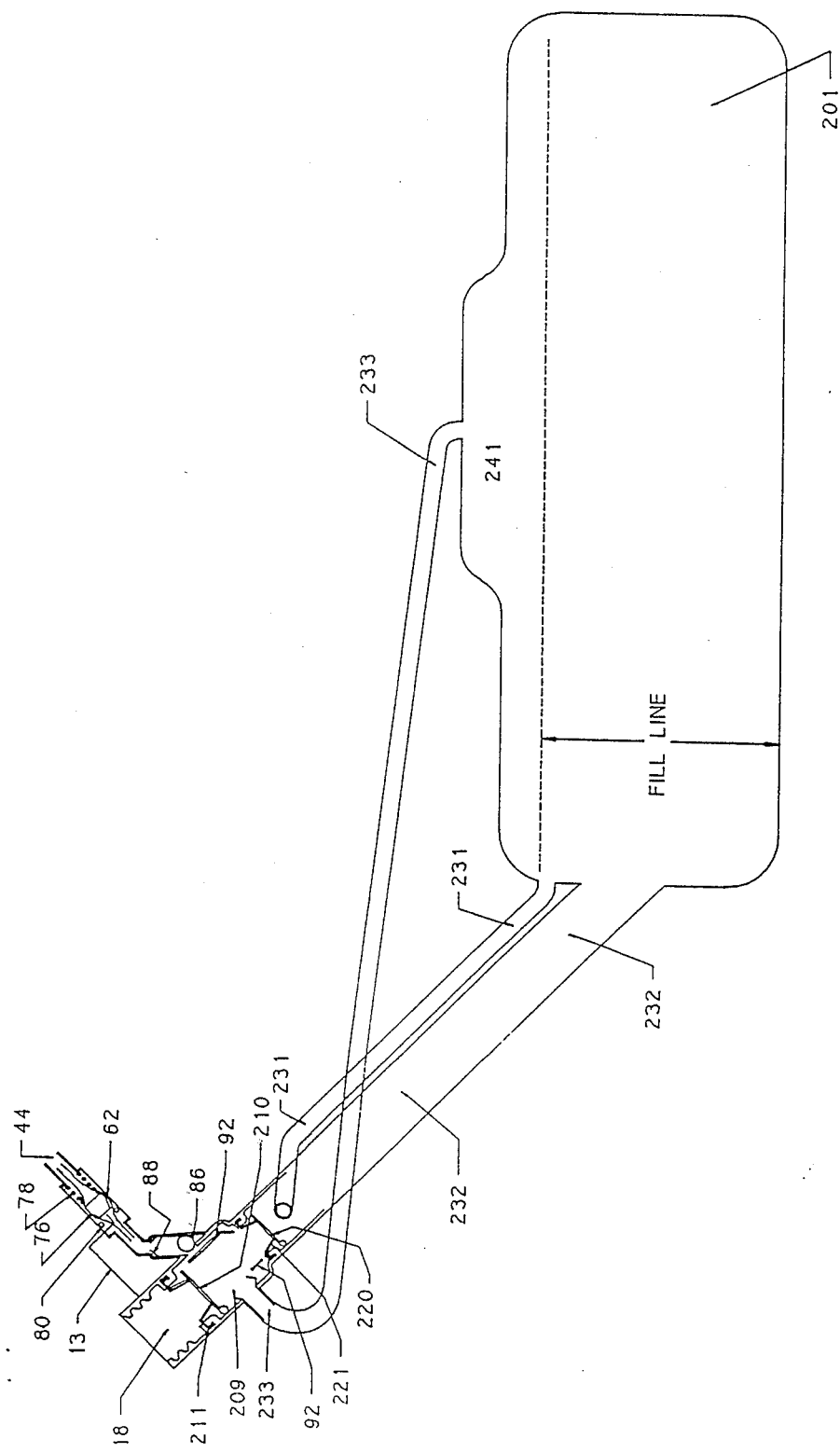
Figure 22:
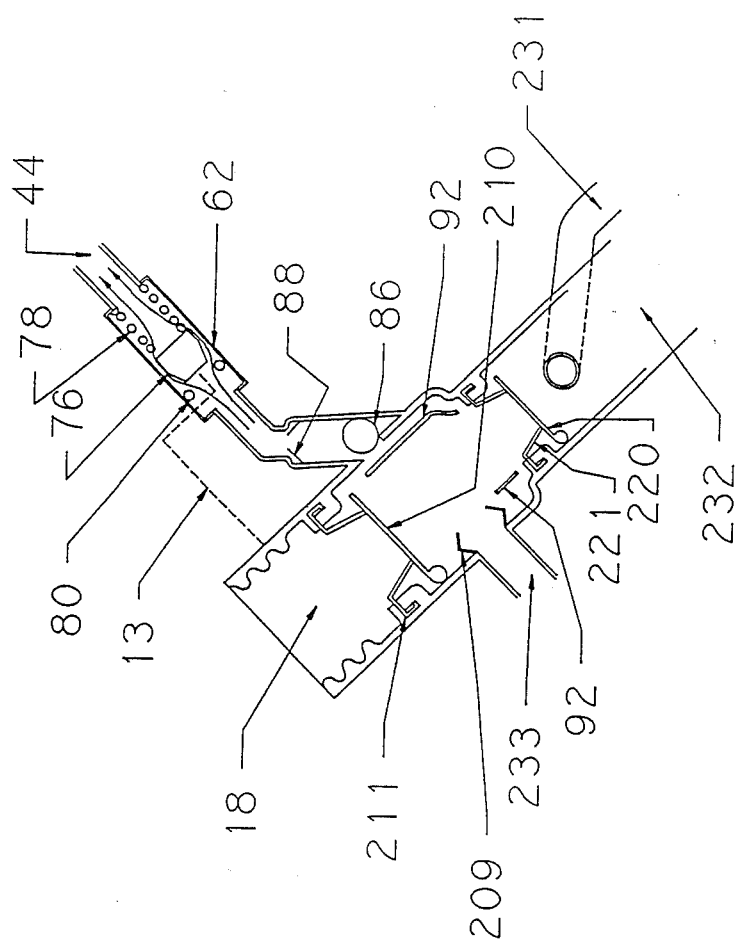

FIGS. 17 and 22 show the configuration of the system with cap 24 removed. As shown in, for example, FIG. 11, with the cap removed, spring 74 is free to move lever arm 72 against valve body 76 to open valve 62. Fuel vapors now flow out of dome 241, through conduit 233, past baffle assembly 92, past ball 86, through valve 62 and out of conduit 44 to the vapor capture device. These flows continue until the tank pressure drops to atmospheric pressure.

Even if the liquid fuel should boil during this process, no expulsion will occur because flapper door 210 is sealed against seal 211. Also, flapper door 220 is sealed against seal 221 thus providing additional protection against expulsion. The seal between flapper door 200 and seal 221 also prevents liquid fuel from reaching ball 86. This is an important function for this flapper door since such liquid fuel could drive ball 86 into seal 88 and thus seal shut the vent path before all of the pressure in the tank had been vented.

FIGS. 18 and 23 show the configuration of the system during fill-up. Fuel pump nozzle 202 is inserted through seals 211 and 221, and opens doors 210 and 220. As discussed above, seal 211 is sized to form a seal with the outer surface of the nozzle. This seal prevents vapor and liquid fuel from escaping from mouth 18 if any residual pressure should remain in tank 201. As also discussed above, a seal is not formed between the nozzle and seal 221. The opening of door 210 by nozzle 202 moves the door into sealing contact with seal 209, thus closing off conduit 233. The closing of this conduit prevents venting of dome 241 and thus results in normal nozzle shut-off when conduit 231 becomes covered with fuel.

As the fill-up procedes, vapor moves up passages 231 and 232, through baffle assembly 92, past ball 86, through open valve 62, and through conduit 44 to the vapor capture device. As discussed above, during this process, baffle assembly 92 controls the splashing of liquid fuel onto ball 86, and ball 86 prevents substantial amounts of liquid fuel from being pumped through the cap-controlled valve assembly into the vapor capture device as the tank becomes completely full.

After fill-up has been completed, nozzle 202 is removed from conduit 232, ad the system returns to the configuration of FIGS. 17 and 22. Cap 24 is then replaced, bringing the system to the normal operating configuration of FIGS. 16 and 21. The vehicle is then ready for use until the next refueling becomes necessary.

Figure 19:
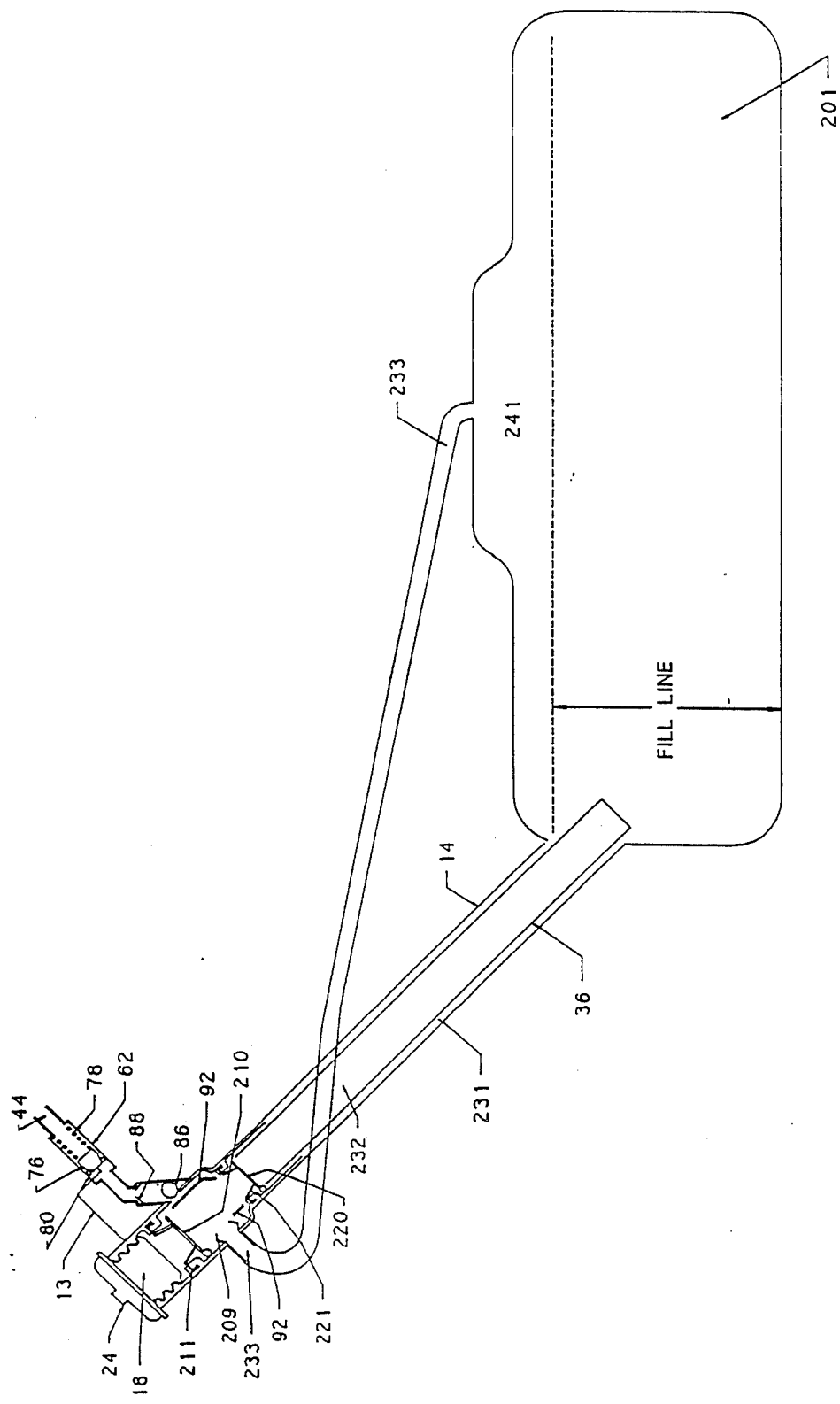
Figure 20:
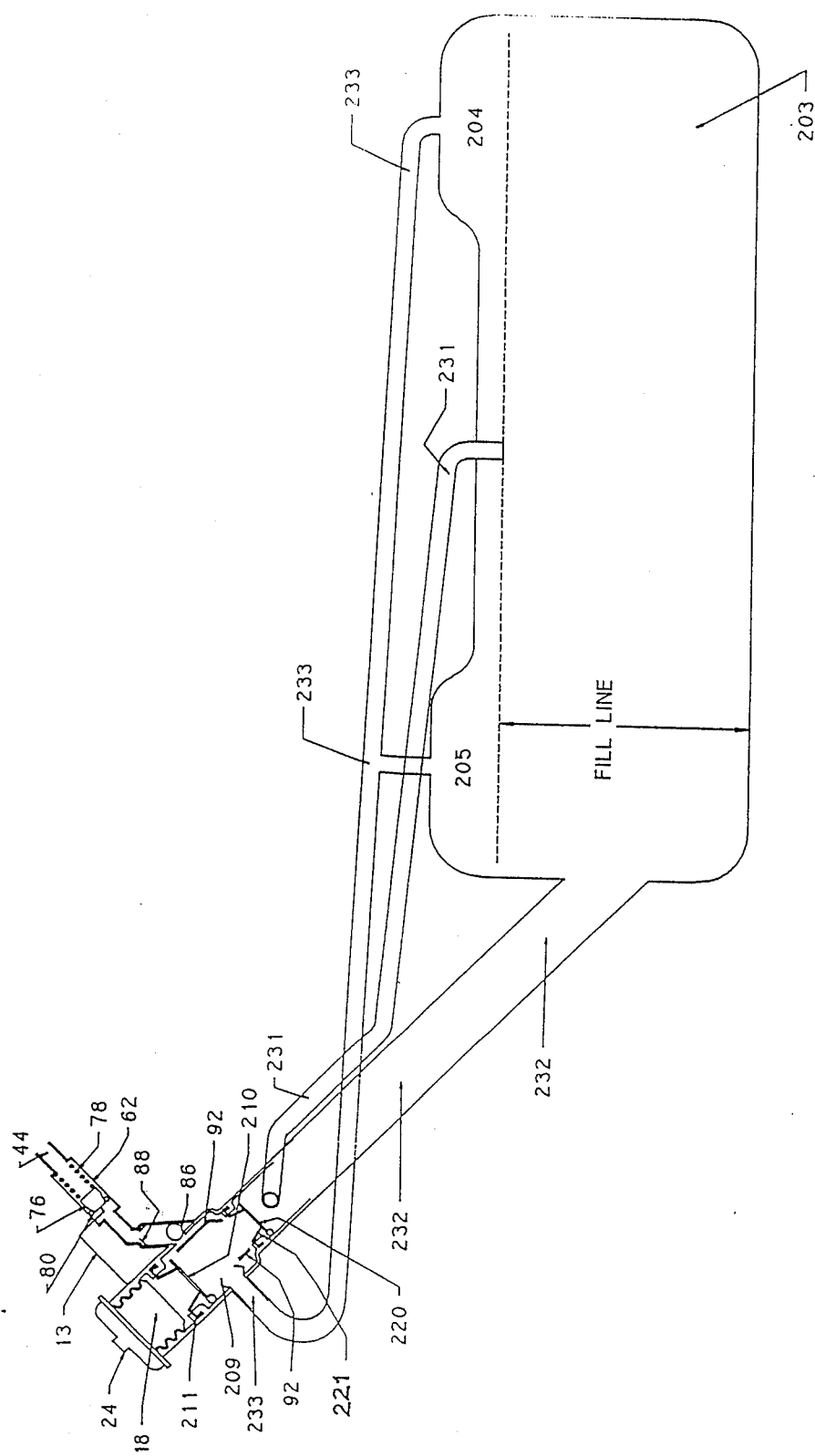

FIGS. 19 and 20 illustrate the application of the expulsion control system to fuel tanks having configurations different from that shown in FIGS. 16-18. In particular, in FIG. 19, conduit 231 is not formed as a separate tube, but rather comprises the space between outer hose 14 and inner hose 36. In FIG. 20, fuel tank 203 has two domes 204 and 205, instead of a single dome 241. For this configuration, conduit 233 is attached to each of the domes. Also, for this tank, conduit 231 runs to the space between the domes, rather than to a point just above conduit 232.

FIGS. 19 and 20 show the expulsion control system in its normal operating (cap-on) configuration. The cap-off and refueling configurations are the same as those shown in FIGS. 17 and 18 (and FIGS. 22 and 23) with the alternate tank constructions substituted for the tank construction of FIGS. 17 and 18. The operation of the expulsion control system for each of the cap-on, cap-off, and refueling conditions is the same for the tank configurations of FIGS. 19 and 20 as that described above for the tank configuration of FIGS. 16-18 and 21-23. As will be evident, based on the disclosure herein, the expulsion control system of the present invention can be readily adapted to tank configurations other than those shown by persons of ordinary skill in the art.

The components of the fuel filler pipe assembly of the present invention can be made of standard materials used in the automotive industry. For example, as discussed above, outer tube 12, inner tube 30, housing 46, and cover plate 48 can be made of nylon, acetal or polyester. Valve piston 76 can also be made out of these materials. 0-rings 70 and 80, as well as grommet 34 and seals 88, 209, 211 and 221, can be made of a fluoroelastomer, while post 66, cam arms 64 and 72, and flapper doors 210 and 220 can be made of metal or high strength thermoplastic materials. Other suitable materials for the components making up the filler pipe assembly will be evident to persons skilled in the art in view of the present disclosure.

Although specific embodiments of the invention have been described and illustrated, it is to be understood that modifications can be made without departing from the invention's spirit and scope. For example, partitions other than inner tube 30 can be used to form two conduits within outer tube 12. Similarly, the components of the invention can be arranged relative to one another in a variety of configurations other than those shown.

What is claimed is:

1. A method for venting a dome of a vehicle fuel tank, said tank having a filler pipe which (i) receives a fuel pump nozzle during filling of the tank and (ii) is sealed by a removable cap, said method comprising the steps:
    (a) providing a vent path leading from the dome to a vapor capture device;
    (b) when the cap is in place, opening the vent path when the pressure in the dome rises above a threshold value and closing the vent path when the pressure in the dome drops below the threshold value;
    (c) when the cap is removed and a fuel nozzle is not inserted in the filler pipe, opening the vent path irrespective of the pressure in the dome: and
    (d) when the cap is removed and a fuel nozzle is inserted in the filler pipe, closing the vent path irrespective of the pressure in the dome.

* * * * *